F. W. DILKS, D. REYAM & E. E. DU PONT.
AUTOMOBILE HEATER.
APPLICATION FILED AUG. 26, 1910.
999,487.
Patented Aug. 1, 1911.
2 SHEETS—SHEET 1.
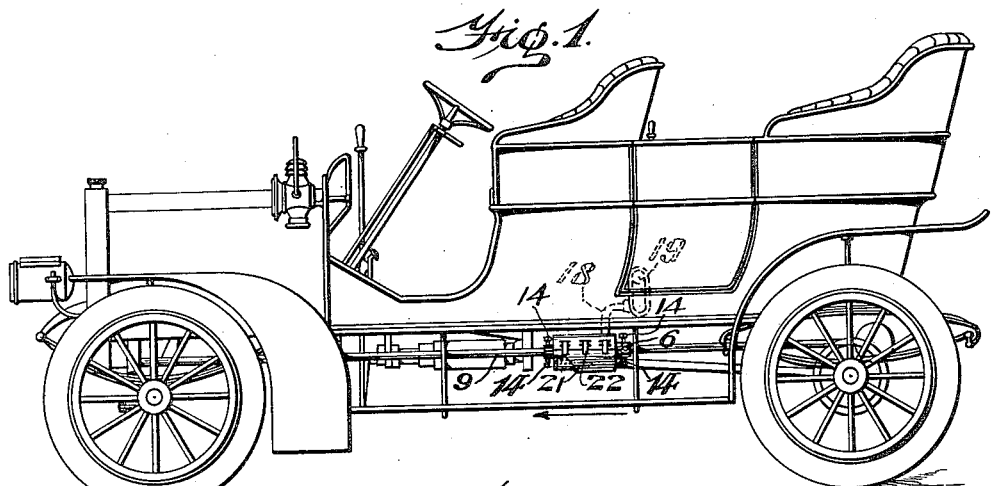
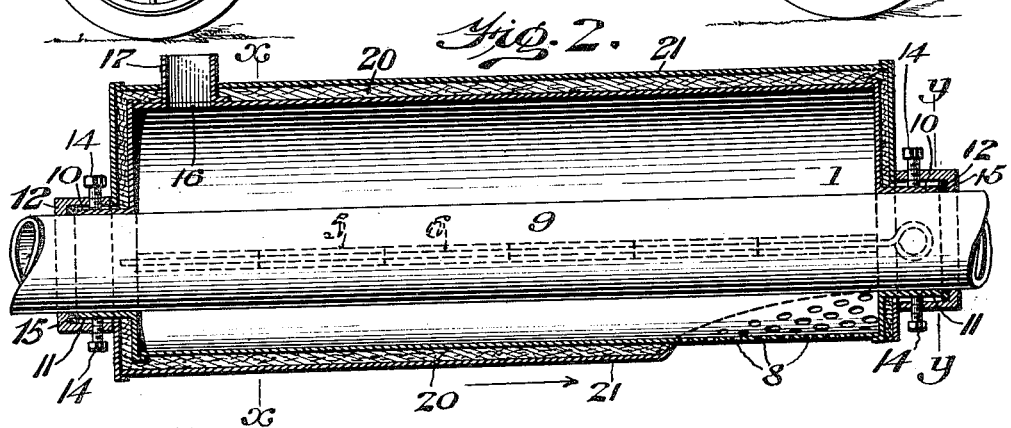
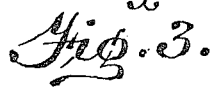
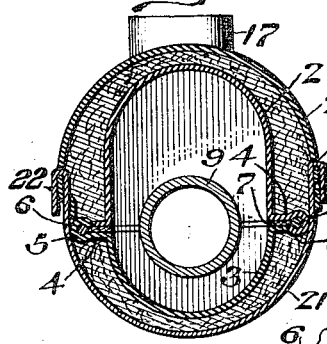
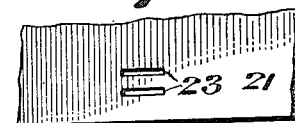
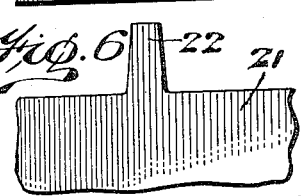

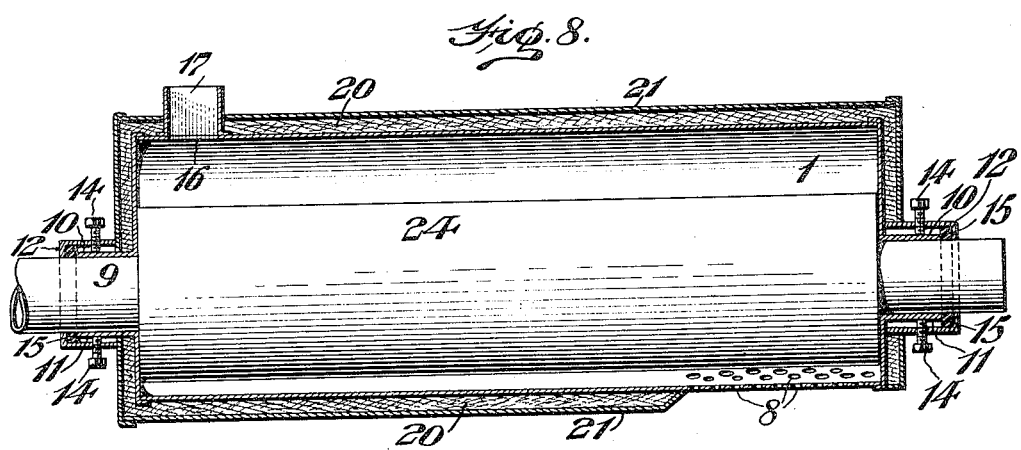

UNITED STATES PATENT OFFICE.

FRANK W. DILKS, OF PHILADELPHIA, PENNSYLVANIA, AND DAVID REYAM AND EUGENE E. DU PONT, OF WILMINGTON, DELAWARE, ASSIGNORS TO THE INTERNATIONAL RADIATOR COMPANY, OF WILMINGTON, DELAWARE, A CORPORATION OF DELAWARE.

AUTOMOBILE-HEATER.

999,487. Specification of Letters Patent. Patented Aug. 1, 1911.

Application filed August 26, 1910. Serial No. 579,066.

*To all whom it may concern:*

Be it known that we, FRANK W. DILKS, a citizen of the United States, residing in the city and county of Philadelphia, State of Pennsylvania, and DAVID REYAM and EUGENE E. DU PONT, both citizens of the United States, residing in the city of Wilmington, county of Newcastle, State of Delaware, have invented a new and useful Automobile-Heater, of which the following is a specification.

Our present invention relates to heating devices which are especially adapted to be employed in conjunction with motor vehicles, motor boats or other structures wherein an engine of the explosion type is employed, and the main object of our invention is to utilize for further heating purposes the heat present in the exhaust of an explosive engine which under ordinary conditions is wholly lost.

As is well known to those skilled in the art, in the operation of automobiles, motor boats and similar devices, and particularly those of the explosive engine type, the exhaust from the engine is expelled to the atmosphere at an exceedingly high temperature, and in passing through the exhaust conduit the latter is heated to a comparatively high temperature, in some cases the same being heated to approximately a red heat, and the main object of our present invention is to utilize this heated surface and direct a current of heated air into a compartment of the motor vehicle, boat or other structure in conjunction with which the heater is employed.

To the above ends our invention consists of a novel and simplified heater which is adapted to utilize the heat absorbed from the exhaust conduit of an explosive engine.

It further consists of other novel features of construction, all as will be hereinafter fully set forth.

For the purpose of illustrating our invention, we have shown in the accompanying drawings, one form thereof which is at present preferred by us, since the same has been found in practice to give satisfactory and reliable results, although it is to be understood that the various instrumentalities of which our invention consists, can be variously arranged and organized and that our invention is not limited to the precise arrangement and organization of these instrumentalities as herein shown and described.

Figure 1 represents a side elevation of an automobile having a heater embodying our invention in operative relation with respect thereto. Fig. 2 represents a longitudinal section of the heater in assembled position with respect to the exhaust conduit. Fig. 3 represents a section on line $x$—$x$, Fig. 2. Fig. 4 represents a section on line $y$—$y$, Fig. 2. Figs. 5, and 6 represent plan views of portions of the outer casing. Fig. 7 represents a side elevation showing more clearly the manner in which the sections of the heater casing are united together. Fig. 8 represents a longitudinal sectional view of our novel heater in assembled position with respect to an exhaust muffler.

Similar numerals of reference indicate corresponding parts in the figures.

Referring to the drawings: 1 designates the inner casing of a heater embodying our invention, which for convenience of assembling is preferably constructed in sections, and comprises an upper section 2 and a lower section 3, each of which is provided with outwardly extending flanges 4 which terminate in tubular members as knuckles which closely but freely interfit side by side as most plainly shown in Fig. 7. These members 5 are alternately disposed on their respective sections, so that when the two sections are in assembled position, the tubular members 5 will interfit and aline in such a manner that a locking rod 6 may be passed therethrough, and in order to provide an airtight joint a suitable packing 7 is preferably employed.

The casing 1 is provided with a desired number of perforations located at a suitable point thereon, and for purposes of illustration, we have shown these perforations or apertures as located in the under section 3. These perforations or apertures 8 are for the purpose of permitting fresh atmospheric air to enter the interior of the casing 1 into contact with the exhaust conduit 9, which, as will be apparent from Fig. 2, is surrounded by the casing 1.

10 and 11 designate outwardly extending flanges or collars preferably integral with the casing sections 2 and 3 respectively, said flanges being of such diameter that they will engage the exhaust conduit 9 and serve as a support for the closed ends of the casing 1.

12 designates rings or sleeves which, in the present instance, are preferably made in sections and having on their outer ends the inturned walls or flanges 15 with openings centrally therein adapted to fit over the exhaust pipe 9 and inclose the flanges 10 and 11, the same being held in assembled position by means of the fastening devices 13.

14 designates set screws carried by the supporting rings or sleeves 12 which are adapted to engage the flanges 10 and 11 to maintain the parts in assembled position, and in order to prevent any leakage of the joint we preferably employ suitable packing which encircles the adjacent portions of the conduit 9, and is interposed between the ends of said collars 10 and 11 and the encircling inturned flanges 15 of said sleeves 12, thus rendering said joints tight, and preventing the leakage of hot air thereat.

The casing 1 is provided with an outlet 16 preferably rectangular in form and provided with a conduit 17, to which latter is suitably connected a conduit 18 which leads to a register 19 or other point of utilization of the heat absorbed from the exhaust conduit 9, and in the present instance we have shown this as leading to a register located within the body of the automobile.

In order to prevent loss of heat due to the radiation thereof from the exterior of the casing 1, we preferably surround the same with insulating material, such as for example, asbestos or magnesia packing 20, which is held in position by means of an outer casing 21, which latter, for purposes of illustration we have shown as being formed in sections, one of the sections being provided with the tongues 22 which co-act with the slots 23 to maintain the outer casing 21 in assembled position. It will be seen that the outer casing 21 with the intermediate packing 20 forms a jacket for the heating chamber, said chamber being adapted first for the entrance of fresh air thereinto, and next, the discharge of the same into the body of the vehicle in heated condition, the air being heated by the said conduit 9 as has been stated. The casing 21 may be removed by disconnecting the tongues 22 from the slots 23, when the sections of the former are separated, it being evident that said tongues are pliable and bendable for their purpose. The casing 1 may be removed by withdrawing the rods 6 from the tubular ears or members 5 when the sections of said casing are separated.

In the embodiment seen in Fig. 8, we have shown our novel heater as being employed in conjunction with a muffler 24 which is located at a suitable point on the exhaust conduit 9.

The operation of our novel heater will now be readily apparent to those skilled in this art, and is as follows:—A current of air is maintained through the casing by the movement of the vehicle and the natural tendency of the hot air to rise. When the vehicle is at rest the air is brought into the compartment to be heated by the natural tendency of the hot air in the casing to rise and passes through the casing from one end to another, the amount of air delivered at the register being sufficient for the purposes of heating within the desired compartment, whether the automobile or other explosive engine driven vehicle is in motion or at rest. Whether forced or rising naturally, the current of air enters the perforations or apertures 8 in the casing 1, and in passing through the casing absorbs the heat from the exhaust conduit 9, and the air in its heated condition then passes out through the conduits 17 and 18 to the register 19 or other point of utilization within the compartment which is to be heated.

Our novel device is particularly well adapted for employment in connection with automobiles having a closed body, and the temperature within the same is raised to a considerable degree above that of the outside air, and the automobile is made exceedingly comfortable for use in cold weather.

It is to be noted that the heated air is free from noxious gases or any impurities, since the device is supplied with pure atmospheric air which is heated only by its contact with the outside of the exhaust conduit and the heat radiating therefrom.

It will be evident that we have provided a novel form of heating device which may be readily adjusted to any type of explosive engine exhaust construction, and it is unnecessary to change in any manner the general construction or operating mechanism of the motor vehicle, boat or other structure in conjunction with which the same is employed, and it is simply necessary to provide a suitable register in the compartment which it is desired to heat.

It will now be apparent that we have devised a novel and useful construction of an automobile heater which embodies the features of advantage enumerated as desirable in the statement of the invention and the above description, and while we have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:—

1. In a heater applicable to an exhaust conduit of an engine of a motor vehicle, a heating casing having a fresh air inlet and a hot air outlet, out-turned collars on the ends of said casing, sleeves encircling said collars, said sleeves having inturned flanges on the outer ends thereof, and set screws in said sleeves adapted to bear against said collars, said casing being adapted to surround a portion of said exhaust conduit and said collars, and said inturned flanges of said sleeves being adapted to embrace tightly said conduit.

2. In a heater applicable to an exhaust conduit of an engine of a motor vehicle, a heating casing having a fresh air inlet and hot air outlet, the same being formed of sections and having means for connecting the sections, out-turned sectional collars on the ends of said casing, sleeves encircling said collars, said sleeves being formed of sections, and having means for connecting the same, said sleeves having inturned flanges on their outer ends, and set screws in said sleeves adapted to bear against said collars, and said casing being adapted to surround a portion of said conduit, and said collars and said inturned flanges of the sleeve being adapted to embrace tightly said conduit.

FRANK W. DILKS.
DAVID REYAM.
EUGENE E. du PONT.

Witnesses:
E. M. PRINCE,
ALFRED TAIT.